United States Patent [19]

Rixen et al.

[11] Patent Number: 5,474,270
[45] Date of Patent: Dec. 12, 1995

[54] CLAMPING DEVICE

[75] Inventors: Edgar Rixen; Norbert Flammann, both of Solingen, Germany

[73] Assignee: Rixen & Kaul GmbH, Solingen, Germany

[21] Appl. No.: 29,790

[22] Filed: Mar. 11, 1993

[30] Foreign Application Priority Data

Mar. 12, 1992 [DE] Germany .......................... 42 07 842.3
Apr. 18, 1992 [DE] Germany .......................... 42 12 415.8

[51] Int. Cl.⁶ .................................................. A47B 96/06
[52] U.S. Cl. .................. 248/230.5; 224/39; 248/221.11; 248/223.41
[58] Field of Search ...................... 248/229, 230, 248/225.31, 231.1, 231.6, 231.9, 222.1, 223.3, 223.4, 224.4, 225.1, 221.3; 224/39, 32, 35, 37, 38, 30

[56] References Cited

U.S. PATENT DOCUMENTS

| | | | |
|---|---|---|---|
| 311,731 | 2/1885 | Edge ........................... 248/231.6 |
| 1,020,486 | 3/1912 | Embree ...................... 224/39 R |
| 1,040,192 | 10/1912 | Hall .......................... 224/39 R |
| 1,058,229 | 4/1913 | Futhey ....................... 224/39 |
| 1,408,993 | 3/1922 | Eberhardt . |
| 2,574,007 | 11/1951 | Anderson ................... 248/230 |
| 2,994,501 | 8/1961 | Barnard ..................... 248/231.6 |
| 3,145,365 | 8/1964 | Jacobs ........................ 248/230 |
| 3,999,055 | 12/1976 | Wakahara et al. . |
| 4,286,360 | 9/1981 | Skobel . |
| 4,392,279 | 7/1983 | Schwager . |
| 4,542,839 | 9/1985 | Levine et al. . |
| 4,623,348 | 12/1986 | Keesling et al. ............ 248/222.1 |
| 4,712,280 | 12/1987 | Fildan . |
| 4,874,147 | 10/1989 | Ory et al .................... 248/222.1 X |
| 4,924,562 | 5/1990 | Pogharian . |
| 4,948,085 | 8/1990 | Mittelhauser ............... 248/222.1 X |
| 5,075,938 | 12/1991 | Hutchinson . |
| 5,113,553 | 5/1992 | Hutchinson . |
| 5,151,828 | 9/1992 | Sugimura . |
| 5,190,345 | 3/1993 | Lin ............................. 224/39 R |
| 5,253,831 | 10/1993 | Theodorides .............. 248/222.1 X |

FOREIGN PATENT DOCUMENTS

| | | |
|---|---|---|
| 0523505 | 1/1993 | European Pat. Off. . |
| 101798 | 3/1899 | Germany . |
| 387688 | 3/1921 | Germany . |
| 1787471 | 4/1959 | Germany . |
| 8326235 | 2/1985 | Germany . |
| 3428256 | 3/1985 | Germany . |
| 4003474 | 8/1991 | Germany . |
| 361237 | of 1922 | Netherlands . |
| 2145810 | 4/1985 | United Kingdom . |
| 2231313 | 11/1990 | United Kingdom . |

Primary Examiner—Ramon O. Ramirez
Assistant Examiner—Korie H. Chan
Attorney, Agent, or Firm—Wolf, Greenfield & Sacks

[57] ABSTRACT

A clamping device that can be utilized to clamp an accessory to a bicycle frame provides a housing that can be attached to the frame. The housing includes a slot that slidably receives an anchor attached, typically, to an accessory. A retaining bar located in the housing includes a shoulder that projects into the slot and that engages a groove in the anchor in a normal resting state. The shoulder, by engagement with the groove, retains the anchor in the slot. The retaining bar can be activated by applying force to at least one of two ends located upon opposing sides of the housing. By applying force to one of the ends, the retaining bar buckles, folds or slides so that the shoulder is moved out of engagement with the groove. The anchor can thereby be slidably removed from the slot.

50 Claims, 10 Drawing Sheets

CLAMPING DEVICE

FIELD OF THE INVENTION

The present invention relates generally to a device for detachably clamping two components together and more particularly to a clamping device for detachably securing an accessory to a bicycle frame or similar structure.

BACKGROUND OF THE INVENTION

A variety of devices have been developed for detachably securing two articles together. It is particularly desirable that articles of luggage and various accessories utilized, for example, on bicycles be removable. For example, a rider may desire to vary the accessories carried by the bicycle or omit them at certain times when they are not necessary and would only serve to add bulk to the bicycle frame. Similarly, the rider may wish to detach accessories, such as bags carrying valuables and expensive components such as odometers, and carry them with him or her when parking the bicycle.

The prior art has addressed the problem of detachably securing larger pieces of luggage such as saddle bags, to bicycle frames and similar structures by providing a hinge into which the luggage is placed. A locking piece is then swung down on the hinge into a position that locks the luggage onto the frame. Such a device is disclosed in German Patent No. DE-OS4003474.

This solution is desirable for supporting relatively heavy articles from the frame. However, this method of attachment is not convenient for attaching articles under the saddle. This attachment method is also too cumbersome and expensive for use with smaller articles such as tachometers, odometers, water bottles or small bags.

Accordingly, it is an object of this invention to overcome disadvantages of the prior art and to provide a clamping device that enables quick attachment and detachment of articles particularly in conjunction with a bicycle frame. Additionally, it is an object of this invention to provide a relatively versatile clamping device that can be utilized to clamp a variety of different articles together and that, preferably, enables clamping of articles together in a plurality of different orientations. This clamping device should also be relatively inexpensive to produce.

SUMMARY OF THE INVENTION

According to a preferred embodiment of this invention, a clamping device, that can be attached to a bicycle to detachably support an accessory, comprises a housing that is attachable to the frame of a bicycle and an anchor that is attached to the accessory. The housing includes a slot and the anchor is sized to be received by the slot along a predetermined path. Typically, the anchor can only be removed from the slot along the path. The housing further includes a retaining bar having at least one end that projects out of the housing. The retaining bar includes a shoulder or, alternatively, is constructed so that it extends into the slot. This extension occurs in a normal resting state of the bar in which no external force is applied to the end. The bar, projection or shoulder engages a corresponding stop in the anchor that retains the anchor in the slot against slidable movement. The stop can comprise a projection or a groove. Similarly, the retaining bar can comprise a locking structure that engages the projection or groove. Typically, a wall or shoulder on the bar engages a corresponding groove on the anchor while a recessed groove on the bar engages a corresponding projection on the anchor.

By applying force to the end of the retaining bar in a predetermined direction, the retaining bar translates in a non-parallel second direction so that the bars locking structure is taken out of engagement with anchor's stop. Accordingly, the anchor can be slid out of the slot. Typically, the anchor includes a ramped surface so that it automatically lifts the retaining bar out of the slot when the anchor is slid into the slot. In this manner, external force must only be applied to remove the anchor from the slot and not to place the anchor initially into the slot.

According to this invention, a second opposing end of the retaining bar can also project out of the housing. By applying pressure to either or both of the opposing ends, the retaining bar disengages the anchor. In a preferred embodiment, the retaining bar comprises a leaf spring that buckles in one direction by applying force to one or both of the handles a substantially perpendicular direction toward the housing. The leaf spring includes abutments that abut interior side walls of the housing in this embodiment so that only one side of the retaining bar need have force applied to it while the abutment provides a resultant force in the opposing direction that causes buckling away from the anchor. The housing can further include clamping structures that allow it to be removably attached to a bicycle frame or similar structure.

According to an alternative embodiment, the retaining bar can comprise a rotary shaft having an extension and a shoulder that rotates into engagement with a groove of the anchor and is brought out of engagement with the groove of the anchor by applying force to one of a pair of opposing lever arms extending from opposite sides of the housing. The retaining bar can also comprise a laterally sliding structure with an interfering structure that engages a groove or a similar stop on the anchor. Upon opposing sides of the shoulder are provided recesses that, when slid into alignment with the anchor, allow the stop to pass through the recess and out of the slot. Finally, the retaining bar can comprise, according to another alternative embodiment, a bar that is biased by a spring against the anchor and, thereby, engages a stop on the anchor. By applying a force in a direction away from the anchor to either or both ends, the bar is rotated or lifted, respectively, upwardly out of contact with the anchor. The anchor can, thus, be slidably removed from the slot.

BRIEF DESCRIPTION OF THE DRAWINGS

The foregoing and other objects and advantages of the invention will become more clear with reference to the following detailed description of the preferred embodiments as illustrated by the drawings in which.

DETAILED DESCRIPTION OF THE PREFERRED EMBODIMENTS

Figure 1:
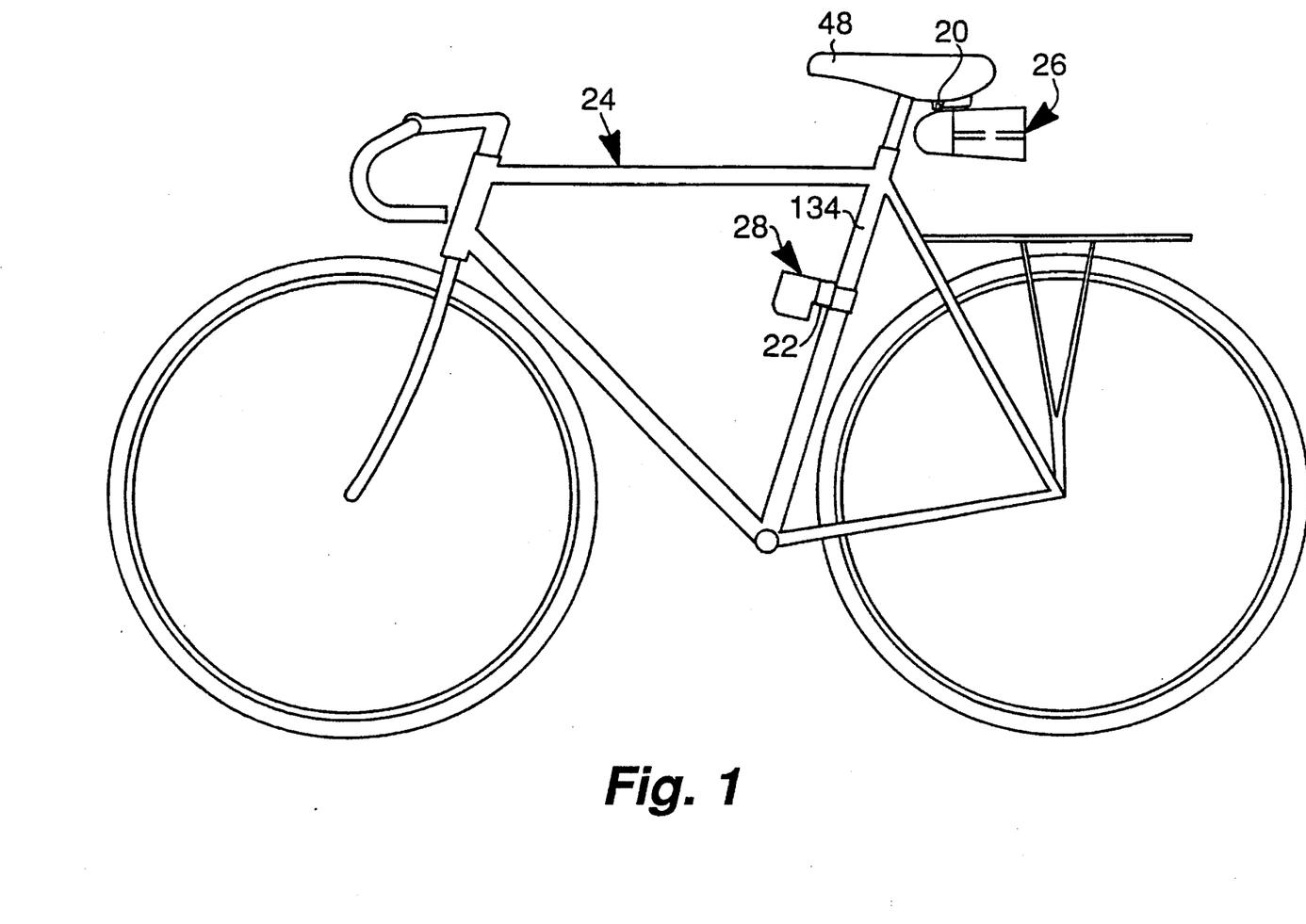
FIG. 1 is a somewhat schematic side elevation view of a bicycle including accessories attached thereto utilizing clamping devices according to this invention.

FIG. 1 illustrates two specific applications of clamping devices 20 and 22 according to this invention. The clamping devices 20 and 22 are used in conjunction with a somewhat schematically depicted bicycle frame 24 that includes an under-saddle bag 26 and a seat tube mounted accessory 28 that are each detachably secured to the frame 24. Each clamping device 20 and 22, as well as alternative embodiments of these devices are described below.

FIGS. 2, 2A, 3 and 3A illustrate a preferred embodiment of a clamping device 20 particularly suitable for attaching the under-saddle bag 26 of FIG. 1. The clamping device 20 according to this embodiment comprises an anchor 30 attached to a backing plate 32 that is, itself, attached to the bag 26. The backing plate 32 and bag 26 can be secured to each other by means of rivets, adhesives, stitching or other suitable attachment methods. The anchor and backing plate can preferably be constructed of a durable polymer such as glass-filled Nylon®.

Figure 3:
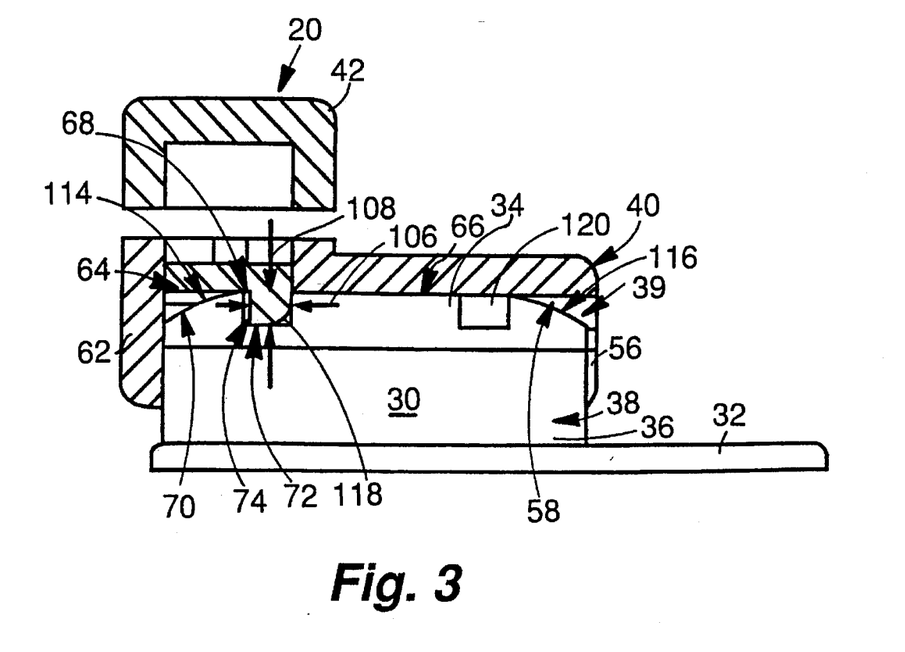
FIG. 3 is a side cross-section of a clamping device taken along line III—III of FIG. 2.
Figure 3A:
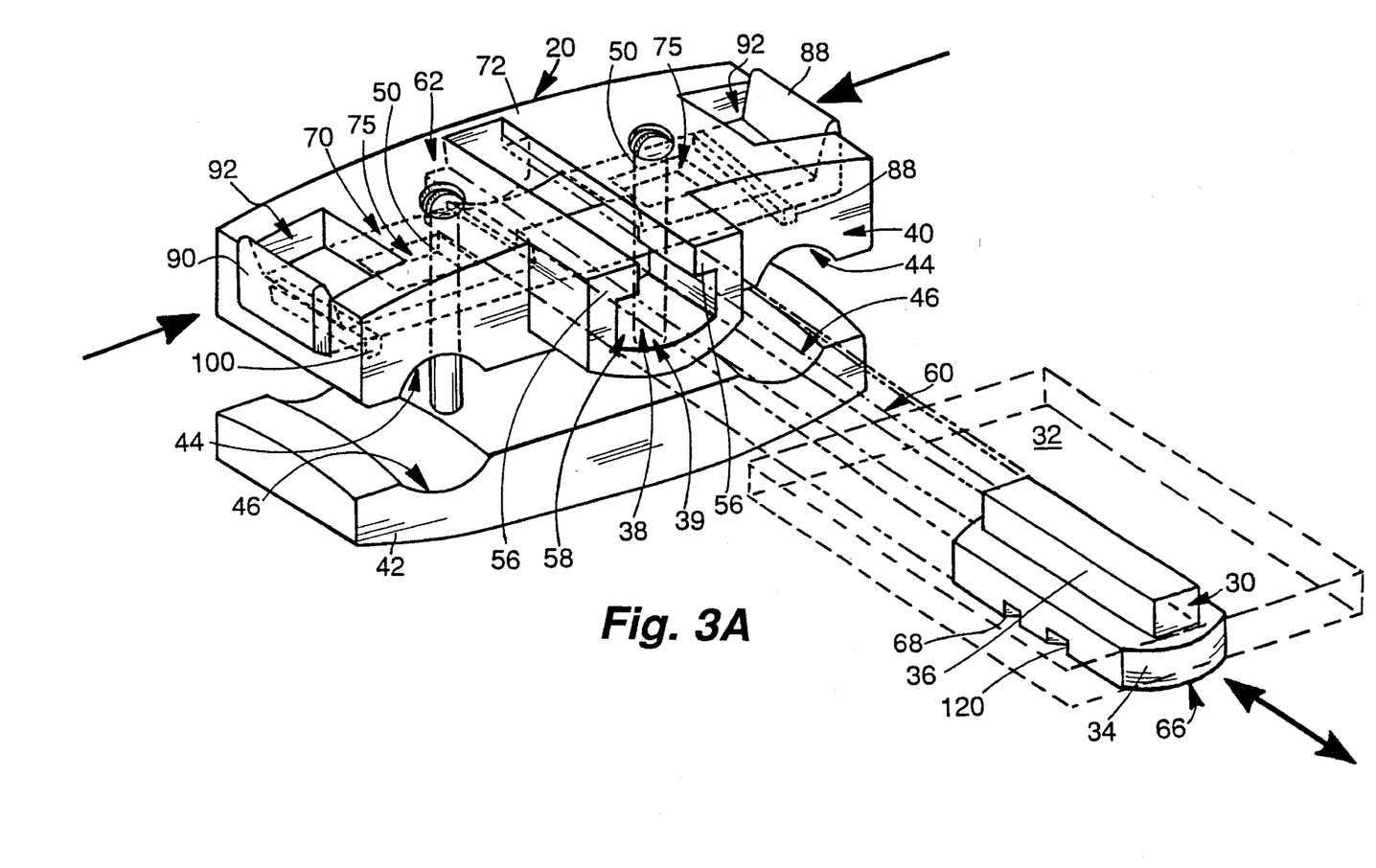
FIG. 3A is a perspective view of the clamping device according to the embodiment of FIG. 2.

As depicted more clearly in FIG. 3A, the anchor 30 according to this embodiment comprises an enlarged head 34 and a narrowed rib 36 extending from the head 34. The head can preferably be approximately 14 mm wide and approximately 31 mm long and the rib can preferably be approximately 5 mm wide, 31 mm long and 6 mm high. The anchor 30 is substantially "T"-shaped to slidably engage a conforming slot 38 in a clamping device housing 40 through an open end 39 of the slot 38. The housing 40 is mounted to the bicycle frame 24 in this embodiment by means of an opposing clamping plate 42. The housing 40 and the clamping plate 42 each include semicircular grooves 44 and 46, respectively, sized to engage conventional support bars (not shown) located on the underside of a bicycle saddle 48 (FIG. 1)0 The housing 40 and the clamping plate 42 are locked together in tight engagement with the seat support bars by a pair of screws 50 that pass through holes 52 both the housing 40 and the clamping plate 42. A pair of respective nuts 54 are embedded in the clamping plate 42 to receive the screws. The nuts can comprise lock nuts according to this embodiment. The housing 40 can, by tightening or loosening the screws 50 be attached to, removed from or adjusted on the frame 24. In this embodiment, the housing can also preferably be formed from a durable polymer such as glass-filled Nylon®.

The slot 38 in the housing 40 is shaped to conform to the T-shaped outline of the anchor 30. The slot 38 includes a pair of shoulders 56 that are narrower than the more interior portion 58 of the slot 38. The shoulders 56 retain the enlarged head 34 of the anchor 30 within the housing 40. As described above, at least one end of the slot 38 is open (opening 39) to allow the anchor 30 to be passed into the slot 38 along a path defined by the dotted lines 60 of FIG. 3A. The anchor 30 is, thus, slidably engaged by the slot 38. By slidable engagement, it is meant that the anchor 30 becomes retained in the housing 40 by passing through the opening 39 along a predetermined path (dotted lines 60) and the shoulders 56 of the slot 38 guide the anchor 30 in essentially that predetermined path once it is inerted. It is contemplated that only one predetermined path or alignment can be utilized to slidably engage the anchor 30 within the slot 38.

According to this embodiment, the slot 38 also includes an end wall 62 on the side of the housing 40 opposite the opening 39. This end wall 62 is further depicted in FIG. 3. The end wall 62 limits further slidable movement of the anchor 30 into the slot 38. While an end wall 62 is utilized according to this embodiment, it is contemplated that the slot 38 can be open at both ends allowing slidable entry and removal of the anchor 30 in each of two directions along the predetermined path.

The housing 40, according to this embodiment, further defines a hollow interior 64 that accommodates a locking structure for retaining the anchor 30 against slidable movement in the slot 38 at predetermined times. Note that the slot shoulders 56 are sized and arranged so that the anchor 30 extends into the hollow interior 64 of the housing 40. The top surface 66 (e.g. the surface facing into the housing interior 64) of the anchor 30 is rounded according to this embodiment. The rounded top surface 66 includes a groove 68 cut across the anchor 30 substantially transverse to the predetermined direction of slidable engagement. In a preferred embodiment the groove is approximately 2.5 mm deep and 4 mm wide. The groove 68 is engaged by a retaining bar 70 according to this embodiment. The retaining bar 70, which is detailed individually in FIG. 2A, includes a shoulder 72 that projects from the bar in a direction toward the slot 38. The shoulder 72 includes a flat side 74 that abuts an opposing vertical wall 76 of the groove 68. The dimensions of the shoulder should be selected to correspond to the depth and width of the anchor's groove 68. When the shoulder 72 and the groove 68 are in engagement, the anchor 30 cannot slide out of the opening 39 in the slot 38 and is, rather, held against the housing end wall 62.

While a retaining bar 70 having a projecting shoulder 72 is provided according to this invention and an anchor 30 having a recessed groove 68 is also provided, a plurality of interengaging structures are contemplated according to this invention. Accordingly, as used herein, the term "stop" or "stop structure" shall refer to any structure on the anchor surface that interengages with the retaining bar, or some conforming locking structure on the retaining bar, to prevent slidable movement of the anchor. A groove 68 according to this invention is one such stop structure.

The retaining bar 70 according to this embodiment comprises a flexible leaf spring, having an end-to-end length of approximately 61 mm, and constructed of a suitably elastic material such as Delrin®, available from Dupont. The retaining bar 70 rests against a lower surface 69 of the housing in a normal resting state. By "resting state", it is meant a state in which no externally applied force is exerted upon the bar 70. The resting state can include the state in which the shoulder 72 engages the groove 68, and the state in which the anchor 30 is removed from the slot 38 entirely. The housing 40 includes opposing side walls 71 and 73 having openings 76 and 78 through which the ends of the retaining bar 70 project. For sufficient strength, the housing side walls 71 and 73 should preferably be approximately 2 mm thick. The openings 76 and 78 define upper walls 84 and 86 against which the retaining bar ends abut. These walls 84 and 86 limit movement of the bar 70 away from the housing lower surface 69. Thus, the shoulder 72 is normally firmly biased into the groove 68 in a resting state. As is described below, only by flexing the retaining bar can the shoulder 72 be disengaged from the groove to slide the anchor 30 from the slot 38.

The shoulder 72 intersects the curved upper surface of the anchor. Hence, the shoulder 72 is normally positioned in a line with the groove 68, the rounded top surface 66 of the anchor 30 being more internally extended than the bottom of the shoulder 56.

The retaining bar 70 according to this embodiment further includes a pair of handles 88 and 90 that extend substantially transversely to the elongated direction of the bar 70. In a preferred embodiment, the length of extension is approximately 11 mm. In this embodiment, the handles 88 and 90 extend toward the backing plate 32 of the accessory (bag 26). Cavities 92 are provided in the housing 40 to accommodate the extended handles 88 and 90.

In operation, a user applies force to at least one of the two handles 88 and 90 in a direction essentially aligned along the arrows 94 and 96, respectively, as shown in FIG. 3A. Since each ends of the retaining bar 70 includes an abutment 98 and 100, respectively, that bears against a respective side wall 71 and 73 of the housing interior 64, the bar 70 is prevented from exiting the housing 40 upon application of force to the ends. For adequate strength, these abutments should be approximately 1 mm in height and 2 mm in width (width being taken in the direction of elongation of the bar 70) according to this embodiment. The abutments 98 and 100, rather, impart a resultant force through the length of the bar 70 that counteracts the applied force on the respective handles 90 and 88. Given the inherent flexibility of the leaf spring material, the retaining bar 70 buckles in the direction of the arrow 102. The width 106 of the retaining bar 70 according to this embodiment is preferably 11 mm, which is several times greater than its thickness 108 (arrows in FIG. 3), which is preferably 2.5 mm. Accordingly, buckling occurs reliably along the thickness in the direction shown by the arrow 102. The buckling hence, drives the approximate center of the retaining bar 70 away from the top surface 66 of the anchor 30, disengaging the shoulder 72 from the groove 68.

Figure 2:
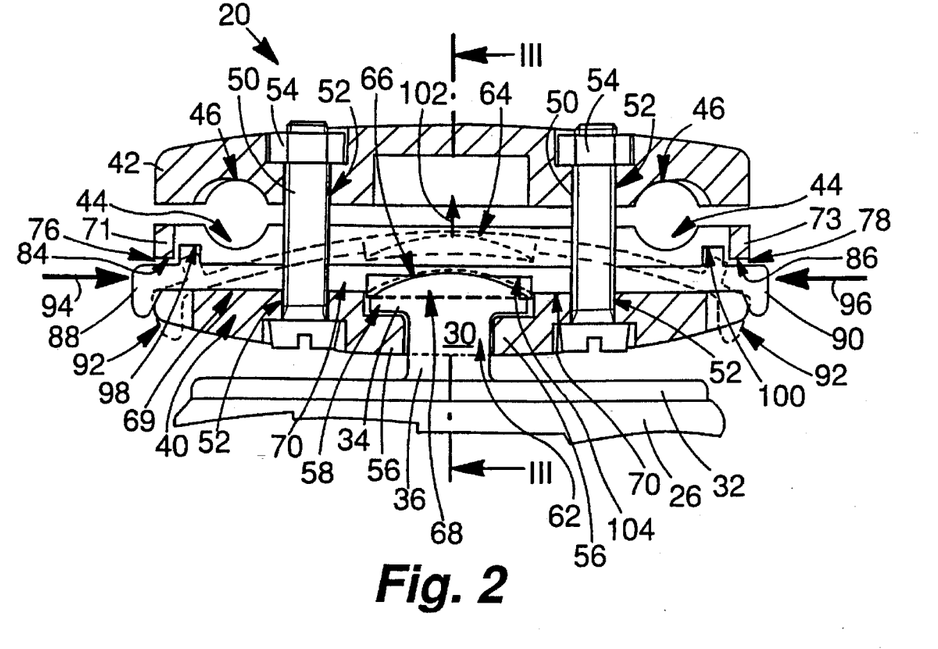
FIG. 2 is a front cross-section of a clamping device according to a preferred embodiment of this invention.

Buckling of the bar 70 is enhanced, according to this embodiment, by providing a reduced thickness section 104 (reduced to a minimum thickness of 1.6 mm) along the side of the retaining bar 70 that faces the anchor 30. Note that the reduced thickness 104, as shown in FIG. 2, is concave to conform to the shape of the anchor upper surface 66. Buckling is also enchanced by providing handles 88 and 90 that extend toward the accessory backing plate 32 as depicted. Since the applied force on the handles 88 and 90 is, typically, somewhat offset and out of alignment with the retaining bar 70, the applied force generates a bending moment along the retaining bar 70 that insures that buckling occurs in a direction away from the anchor 30 (arrow 102).

In an alternative embodoiment (not shown), the retaining bar can be bent or prestressed so that it buckles reliably in a direction away from the anchor.

According to this invention, the buckling direction as symbolized by the arrow 102 shall be termed "non-parallel" to the direction in which forces applied to the handles (arrows 94 and 96). By non-parallel, it is meant that the force is not in a parallel line with the force applied on the handles, and also that this force is not rotationally concentric with the force applied by the handles 88 and 90. Rather, in the embodiment of FIGS. 2–3A the applied forces are essentially perpendicular to the direction of retaining bar buckling. Note that cavities 92 at the housing ends provide room for the handles 88 and 90, respectively to rotate inwardly (as shown in phantom in FIG. 2) toward the housing 40 in response to an application of force thereon.

By providing abutments 98 and 100, adjacent each of the retaining bar ends, the user need only apply force to one of the two retaining bar ends in order to cause the retaining bar 70 to buckle, thus releasing the anchor 30. Selective application of force to one side of the clamping device or the other is particularly desirable when a user may not have both hands free or may be unable to access a given side of the bicycle, such as when it is chained against a wall or other structure. However, it is contemplated that both handles can be operated simultaneously by applying opposing forces in the general direction of the opposing arrows 94 and 96 (FIGS. 2 and 3A). In this instance, the abutments 98 and 100 are both driven away from respective housing side walls 71 and 73 as the bar 70 buckles.

Figure 2A:
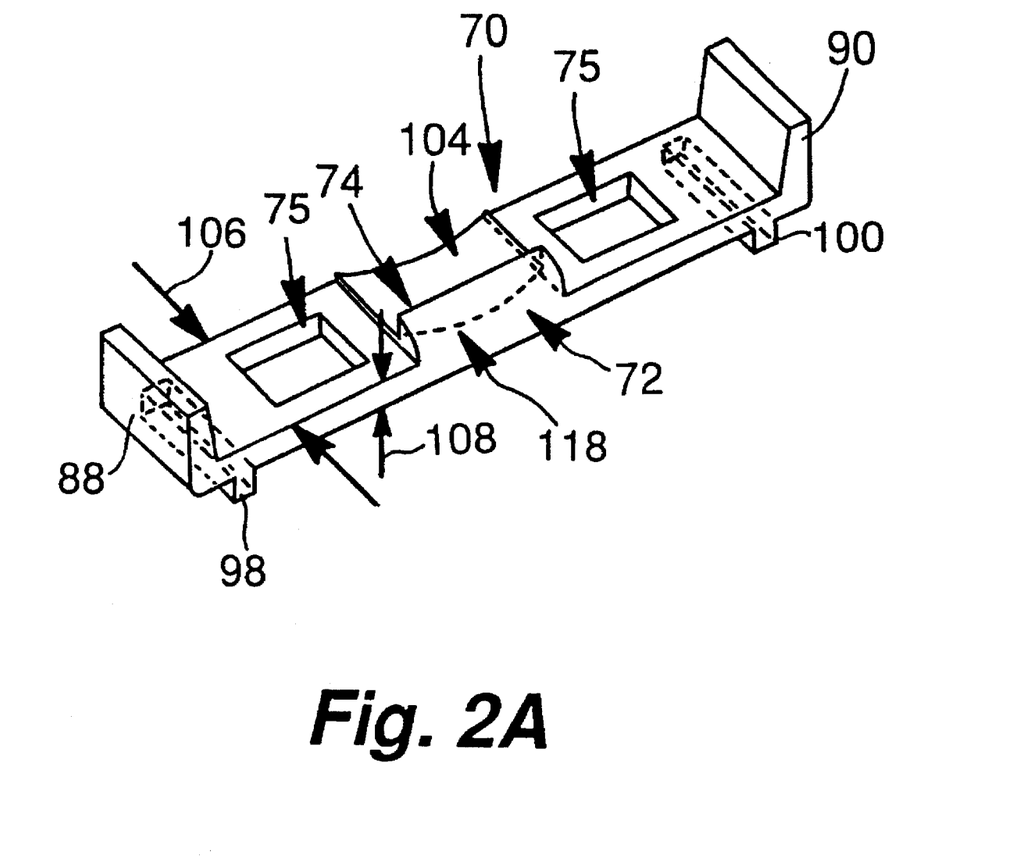
FIG. 2A is a perspective view of the retaining bar of the clamping device of FIG. 2.

As detailed in FIGS. 2A and 3A, the retaining bar 70 includes a pair of holes 75 (shown in phantom) through which the screws 50 pass. These holes are rectangular and have a width of 6 mm and length (along the bar elongation direction) of 10 mm. The holes serve to enhance buckling somewhat, since material is removed from the interior of the bar 70 along its length. The holes 75 are sized large enough so that any resulting lateral movement of the retaining bar 70 due to applied force on the ends, does not cause the bar 70 to bind upon the screws 50.

As shown more clearly in side view in FIG. 3, the anchor 30 is also rounded along the direction of slidable engagement with the slot 38. By providing rounded or "ramped" ends 114 and 116, the anchor 30 acts as a ramp over which the retaining bar shoulder 72 can pass. Hence, the anchor 30 can be slid into the slot so that the groove 68 engages the shoulder without need to apply force to one or both of the bar ends to raise the bar for clearance. Rather, the ramped end 114 of the shoulder 72 acts as a wedge that flexes the retaining bar 70 to raise it as the anchor 30 passes into the slot 38. The anchor groove 68 is located so that the shoulder 72 drops into the groove 68 when the end 114 of the anchor contacts the end wall 62 of the housing 40. At this point, as discussed above, flexing pressure imparted by the anchor top surface 66 on the retaining bar 70 is relieved and the retaining bar 70 returns to a resting state with the shoulder 72 engaging the groove 68. As described above, the shoulder 72 includes a flattened side 74 and an opposing rounded side 118. The flattened side 74 abuts the vertical groove side wall 76 and insures that the anchor 30 cannot pass back out of the slot 38 once the retaining bar 70 returns to a resting state with the shoulder 72 engaging the groove 68. This is because the flat side wall 76 of the groove 68 abuts squarely against the flat side 74 of the shoulder 56. No transverse vector is generated between the groove and shoulder by sliding the anchor in the slot since the walls 74 and 76 are substantially perpendicular to the direction of slidable engagement. In the absence of such a transverse vector, the retaining bar does not buckle. Conversely, the rounded side 118 easily passes over the ramped end 114 of the anchor 30 during slidable attachment of the anchor 30 into the slot 38. Hence a transverse vector, causing bar buckling, is generated.

As depicted in FIG. 3, the anchor includes a second groove 120 and the other opposing ramped end 116. The distance between each groove 68 and 120 and each respective adjacent end 114 and 116 of the anchor 30 is substantially equal. Accordingly, the anchor 30 according to this embodiment can be reversed so that and the shoulder 56, rather than interlocking with groove 68, interlocks with groove 120. Two separate orientations of the anchor 30 relative to the housing 40 are, thus, provided according to this embodiment.

Figure 3B:
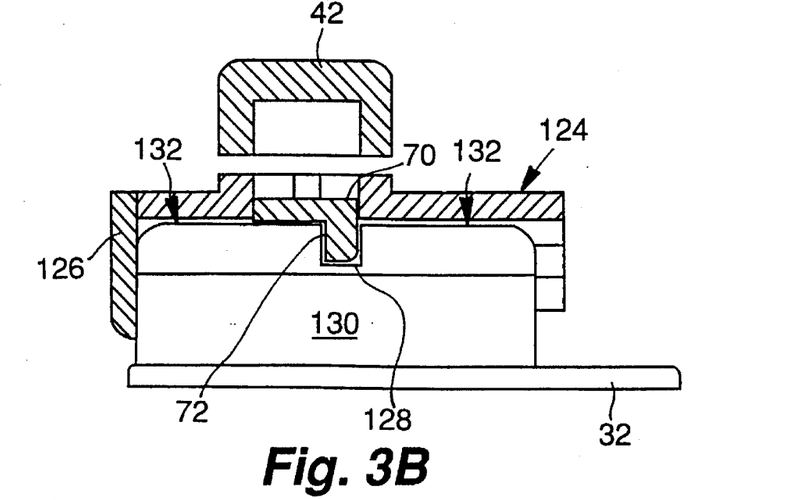
FIG. 3B is a side cross-section of a modified embodiment clamping device of FIG. 2 wherein the anchor includes only one groove.

Anchor reversibility can also be provided using a single groove on the anchor. FIG. 3B illustrates a modified embodiment of a housing 124 wherein the end wall 126 is spaced further from the retaining bar 70 than in the embodiment of FIGS. 2, 3 and 3A. According to this modified embodiment, only one groove 128 need be provided to the anchor 130. The distance between the groove 128 and each end 132 of the anchor 130 is equal, and the distance between the housing end wall 126 and the retaining bar shoulder 72 is chosen to match the distance between the groove 128 and each anchor end 132. Hence, the depicted anchor 130 is also reversible into two orientations in the housing 124, but only a single groove 128 is necessary.

FIGS. 4–7 illustrate an alternative embodiment of the clamping device 22 as depicted on the bicycle frame 24 of FIG. 1. The clamping device 22 according to this embodiment is configured for attachment to one of the tubular frame members of the frame, in particular the seat tube 134. The clamping device 22 is largely similar to that depicted in FIGS. 2, 2A, 3 and 3A, and comprises a housing 136 that includes a slot 138 for receiving the anchor 130 and a hollow interior 139 adapted to receive a leaf spring-style retaining bar 140 according to this invention. The housing 136, unlike that of FIGS. 2–3B, includes extended side plates 142 that overly a clamping bracket 144. The clamping bracket 144 is sized to wrap around a substantial portion of the tubular frame member 134. The bracket 144 and the housing 136 are joined by a pair of screws 146. The screws pass through the housing into tapped holes 148 in the bracket 144. According to this embodiment, the bracket can be constructed preferably from glass-filled Nylon®. The housing 136 and retaining bar 140 can be constructed preferably of glass-filled Nylon® or alternatively of Delrin® or another suitable material. The heads 150 of the screws 146 are seated in the exterior face 152 of the housing 136 and are exposed when the accessory is removed allowing convenient attachment to and detachment from the clamping device from the frame.

Figure 4:
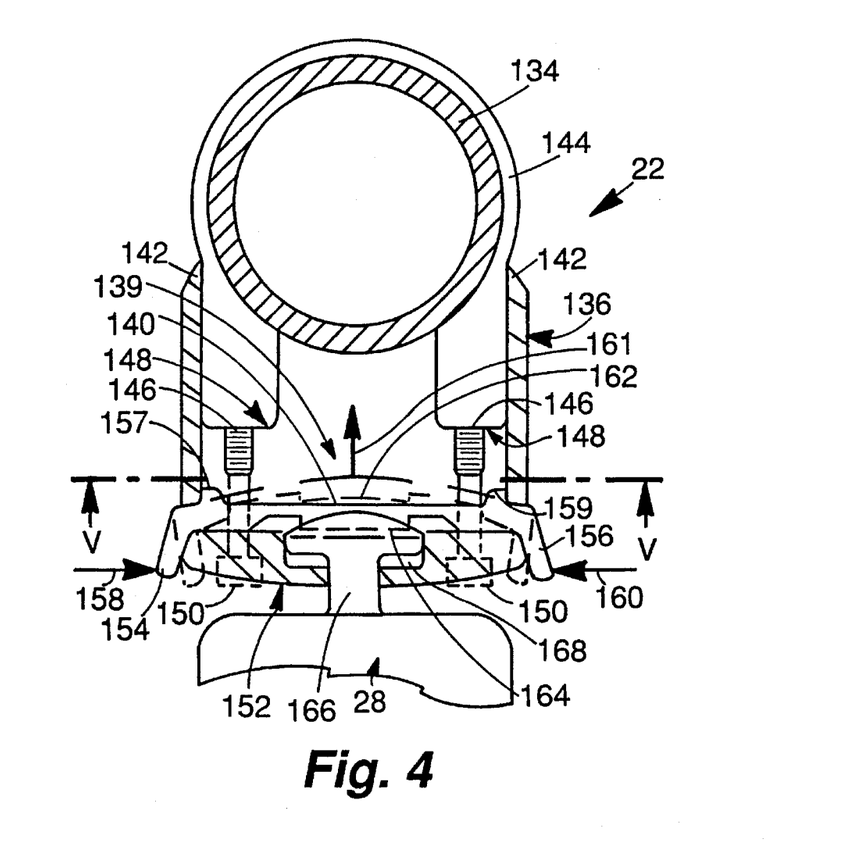
FIG. 4 is a top cross-section of another preferred embodiment of a clamping device according to this invention.
Figure 5:
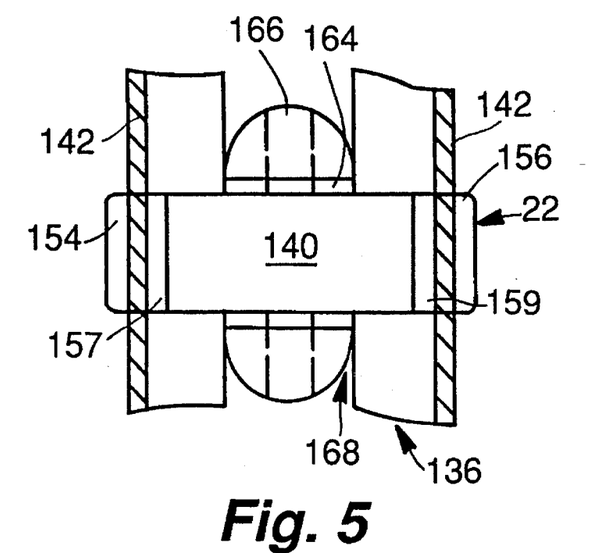
FIG. 5 is a front cross-section taken along line V—V of FIG. 4.
Figure 6:
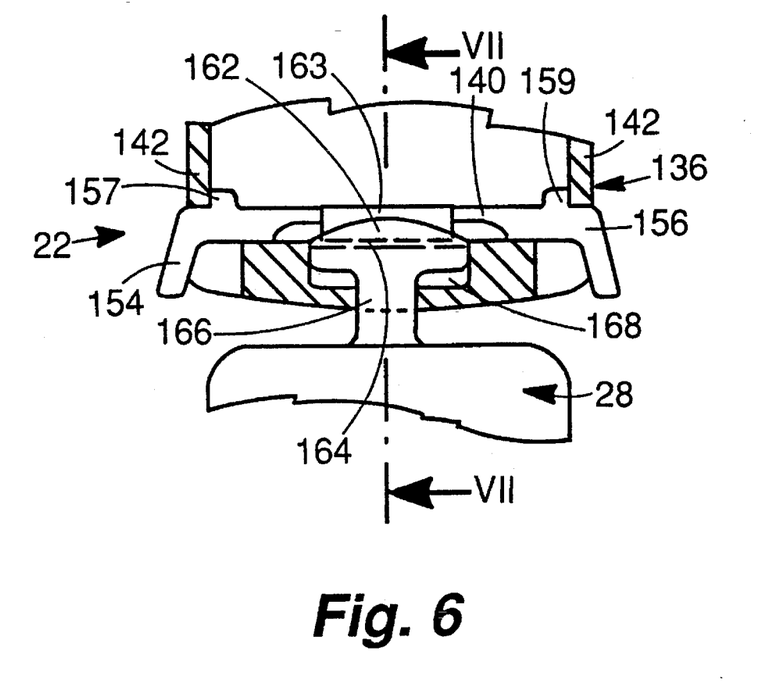
FIG. 6 is a fragmentary top cross-section of a modified embodiment of the clamping device according to FIG. 4.
Figure 7:
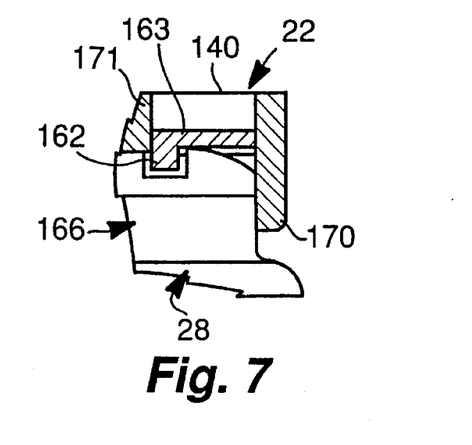
FIG. 7 is a fragmentary side cross-section of the clamping device taken along line VII—VII of FIG. 6.

FIGS. 6–7 which illustrate, essentially, the embodiment of FIG. 4 also include an overlying collar 163 that contacts the end wall 170 and opposing housing wall 171. A possible concern when utilizing a flexible retaining bar is that the bar may underride the housing wall (wall 171) if excessive slidable force is provided to the anchor 166. If the retaining bar is, essentially, disposed below the level of the wall 171, then it can possibly deform by twisting so that the anchor is released from engagement with the bar. Accordingly, by providing a rigid overlying collar 163 to the bar, the walls 170 and 171 are engaged more positively and the housing, as well as the bar, bears the stress of any slidable force imparted upon the anchor 166.

Operation of the clamping device 22 according to the embodiment of FIGS. 4–7 is essentially identical to that of the embodiment of FIGS. 2–3B. A force is applied to one or both of the handles 154 and 156 in the direction depicted by the respective arrows 158 and 160. Consequently, the retaining bar buckles (as shown in phantom) in the "non-parallel" direction of the arrow 161. This buckling, as described above, disengages the retaining bar 140 shoulder 162 from the groove 164 of the anchor 166 allowing the anchor 166 to slide free of the housing slot 168. The handles 154 and 156, according to this embodiment have been slightly modified relative to over those in the FIGS. 2–3A embodiment in that they are more elongated in a substantially transverse direction toward the accessory, and they are angled slightly outwardly from the housing side plates 142. This configuration generates a greater bending moment in the retaining bar 140 upon application of force to the ends of the handles 154 and 156, further facilitating buckling of the retaining bar 140 upon application of force to only one handle. Note that the bar 140 includes abutments 157 and 159 to retain the bar in the housing 136.

As in the embodiment of FIGS. 2–3B, the housing according to this embodiment also includes an end wall 170 (FIG. 7) that prevents the anchor 166 from sliding fully through the slot 168. This end wall 170 can be omitted in certain applications, allowing two-way slidable engagement of the anchor 166 with the slot 168. Similarly, while a double grooved anchor 166 is utilized according to this embodiment, a single groove anchor can also be employed, and the retaining bar shoulder 162 can be positioned so that reversible placement of the anchor 166 in two different orientations is enabled with only one groove.

Figure 8:
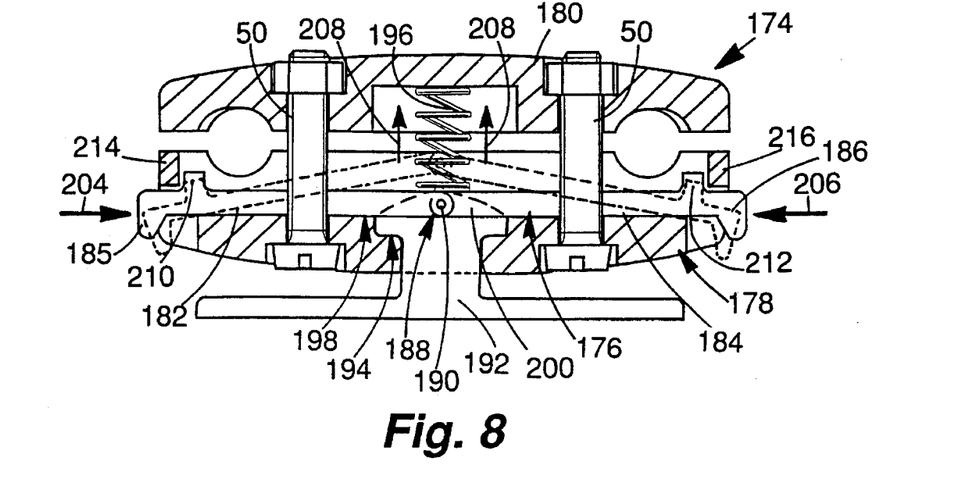
FIG. 8 is a front cross-section of an alternative embodiment of a clamping device according to this invention.

The preceding embodiments have each utilized a leaf spring as a retaining bar. Hence, the retaining bar of these embodiments incorporates both spring and structural support characteristics in one member. FIG. 8 illustrates an alternative embodiment of a clamping device 174 according to this invention in which a substantially rigid retaining bar 176 operates similarly to a leaf spring. The housing 178 and clamping plate 180 are substantially similar to those of the embodiment of FIGS. 2–3A. This housing 178 is arranged for mounting on the support bars of a bicycle seat (not shown). However, the functional concepts of this housing 178, and retaining bar 176 can also be applied to a clamping device configured to attach to a frame tube such as that illustrated in FIGS. 4–7.

The housing 178 can be constructed from materials similar to those in the preceding embodiments. The retaining bar 176, according to this embodiment, comprises a pair of substantially rigid members 182 and 184 that can be constructed from Delrin® or another suitable material. The members 182 and 184 need not have a width as great as that of the previously-described leaf springs and can be constructed of more rigid materials. The members 182 and 184 each include respective handles 185 and 186 similar to those depicted in FIGS. 2–3B at their outwardly projecting ends. The members 182 and 184 are joined at the approximate middle of the retaining bar 176 by a hinge 188 having a pivot 190 with an axis of rotation aligned substantially along the direction of slidable engagement of the anchor 192 with the slot 194. The pivot 190 can be constructed from steel according to this embodiment. A compression coil spring 196 is positioned between the hinge 188 and an opposing surface on the clamping plate 180. The clamping plate 180 is held by screws 50 to the housing 178.

In a resting state, in which the members 182 and 184 of the retaining bar 176 rest against the lower surface 198 of the housing 178, the spring 196 is in compression and exerts a force against the hinge 188. Thus, the members 182 and 184 are normally biased in the direction of the anchor 192 and are held forcibly against the lower surface 198 of the housing 178. The anchor 192 includes at least one groove 200 that is engaged by the retaining bar members 182 and 184. Hence, in a resting state, the retaining bar prevents the anchor from sliding out of the slot 194. Flat edges or shoulders can be provided to the retaining bar to enhance locking of the retaining bar 176 with the groove 200.

In operation, the anchor 192 can be slidably removed from the slot 194 by applying force in the direction of the arrows 204 and 206 to at least one of the handles 185 and 186 of the respective retaining bar members 182 and 184. As in the leaf spring embodiments described above, the application of force in the direction of the arrows 204 and 206 causes the members to fold along the hinge 188 in the direction of the arrows 208 (as shown in phantom). This direction is deemed to be "non-parallel" to the direction of applied force. Since each end of the retaining bar 176 includes a respective abutment 210 and 212 that engages a respective side wall 214 and 216 of the housing 178, application of force upon only one handle 185 or 186 causes a resultant force to be directed back through the retaining bar and, consequently, the members 182 and 184 move upwardly along the hinge 188 against the biasing force of the spring 196 (as shown in phantom). The amount of force necessary to fold the retaining bar is largely determined by the length of extension of the handles 185 and 186 and, more importantly, by the spring constant of the spring. It is contemplated according to this embodiment that more than one compression spring can be utilized and, in fact, an individual compression spring can be utilized with each of the two members 182 and 184 of the retaining bar 176. Other forms of springs can be positioned between the clamping plate 180 and each member 182 and 184.

Figure 9:
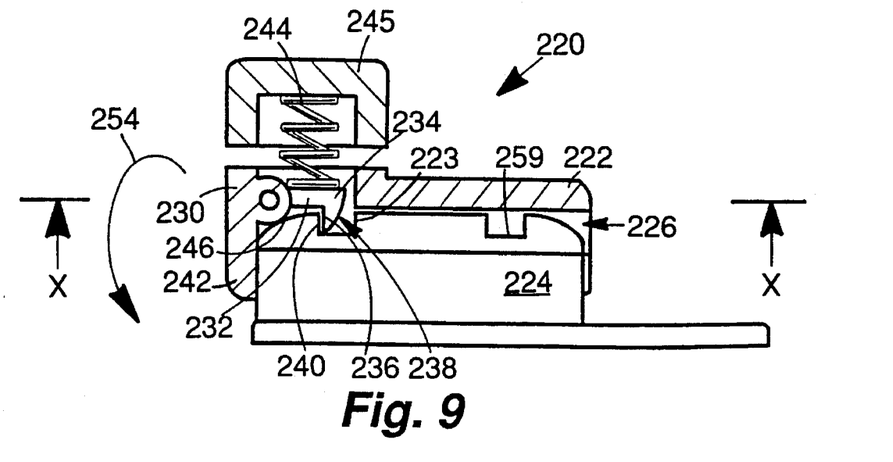
FIG. 9 is a side cross-section of another alternative embodiment of a clamping device according to this invention.
Figure 10:
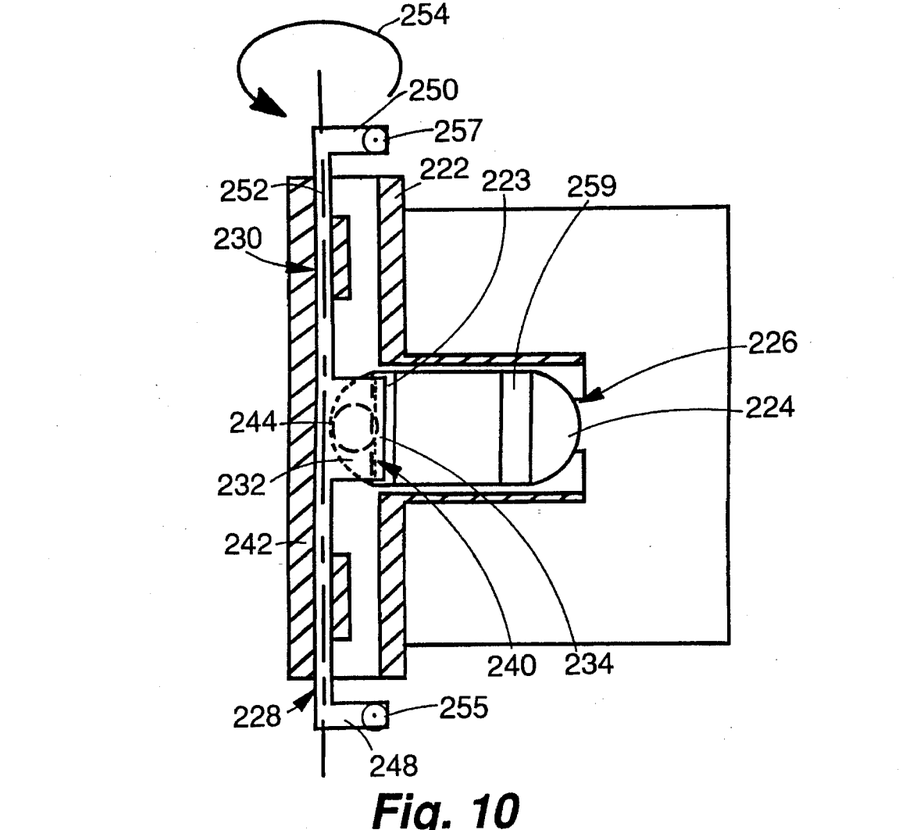
FIG. 10 is a top cross-section of the clamping device taken along lines X—X of FIG. 9.

FIGS. 9 and 10 illustrate another embodiment of a clamping device 220 according to this invention also utilizing a housing 222 similar to that depicted in FIGS. 2–3A. While the anchor 224 and slot 226 of this housing 222 are substantially similar to those of the above-described embodiments, the retaining bar 228 in this embodiment comprises a rotating shaft 230 having, in proximity to the anchor 224, an extension 232 with a shoulder or hook 234 at the end. The hook has a flat surface 236 and an opposing more angled surface 238. The flat surface 236 is positioned to engage a corresponding flat side 240 of the groove 223 anchor 224 when the anchor 224 is positioned against the end wall 242 of the housing 222. Again, it is contemplated according to this invention that the end wall 242 can be omitted, but as in previous embodiments, the shoulder would preferably be constructed with two flat sides to flushly engage each of opposing flat sides of the groove.

The hook or shoulder 234 is biased into the groove 223 by means of a compression coil spring 244 positioned between the clamping plate 245 and the extension 232. As in the embodiment of FIG. 8, a variety of springs can be substituted for the compression coil spring 244 illustrated. In a resting state, the shoulder or hook 234 engages the groove 223. It is desirable to provide some form of stop (not shown) to limit further downward rotation of the shoulder or hook 234 into the slot 226. As such, as the anchor ramp end 246 (FIG. 9) slides into the slot 226, it lifts the shoulder or hook 234 against biasing pressure of the spring 244 until the shoulder or hook 234 reaches the groove 223 wherein it rotates downwardly toward the slot 226 into the groove 223.

The rotating shaft 230 according to this embodiment is provided with two extended handles 248 and 250 on opposite ends of the housing 222. The handles 248 and 250 extend substantially transversely to the rotational axis 252 of the shaft 230. These handles 248 and 250 act as lever arms allowing rotation of the shaft (curved arrow 254) and, consequently, rotation of the extension 232 and shoulder or hook 234 against the biasing force of the spring 244. The user need only apply force (along the direction of arrow points 255 and 257 directed out of the page) to one of the two handles 248 and 250 to facilitate rotation of the shaft 230. Accordingly, only one side of the clamping device need be accessible for releasing the anchor 224 from the housing 222. As in the other embodiments described herein, the anchor includes two grooves 223 and 259 so that its orientation relative to the housing can be reversed. However, a configuration in which the anchor includes only a single groove is also contemplated according to this invention. In order to make a single groove anchor reversible within the housing, the location of the groove would have to be moved to the approximate center of the anchor with respect to the two ends and the shoulder would require similar positioning to engage the groove.

Figure 11:
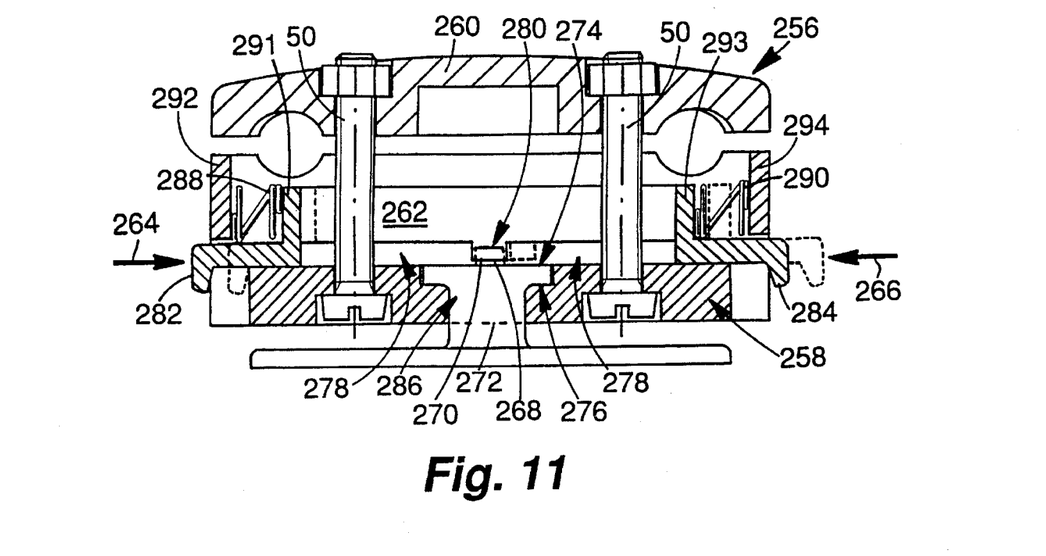
FIG. 11 is a front cross-section of another alternative embodiment of a clamping device according to this invention.

FIG. 11 illustrates another embodiment of the clamping device 256 according to this invention. Again, the depicted housing 258 and clamping plate 260 is adapted for mounting to bicycle seat support bars (not shown). However, a variety of other clamping structures including those depicted for the embodiment of FIGS. 4–7 are also contemplated.

Unlike the previously described embodiments, the retaining bar 262 according to this embodiment is substantially rigid and adapted to translate along the direction of applied force as shown by the arrows 264 and 266. The retaining bar 262 includes a center shoulder 268 that engages a projection or projecting stop 270 on the anchor 272. The anchor according to this invention is flattened along its top surface 274, but can define a variety of shapes. As noted above, the term stop or stop structure refers to any structure on the anchor having at least one flat edge against which an opposing wall of a retaining bar, or a conforming structure thereon, abuts to prevent slidable movement of the anchor. As in the other embodiments described herein, the shoulder 268 retains the anchor 272 in the slot 276 against slidable movement along the slot 276.

The retaining bar 262 also includes, on each adjacent side of the shoulder 268, a recess 278. The recesses 278 provides a clearance that is higher than the topmost edge 280 of the stop 270 of the anchor 272. Thus, if the shoulder 268 is moved laterally, as shown in phantom, out of engagement with the stop 270, the anchor 272 is free to slide along the slot 276. In a basic configuration according to this embodiment, the shoulder 268 must be moved out of engagement with the stop 270 in order to attach or detach the anchor 272 relative to the housing 258. However, a variety of angled surfaces can be provided to both the shoulder and the anchor (not shown) in order to facilitate automatic movement of the shoulder to the side as the anchor is slidably engaged with the slot 276. Typically, removal of the anchor 272 from the slot 276 would, desirably entail actuation of the retaining bar 262 by one of the retaining bar's exterior handles 282 and 284, even if automatic engagement is provided.

As in the other embodiments described above, the housing 258 typically includes an end wall 286 to limit movement of the anchor 272 along the slot 276 in a given direction.

As discussed above, unlike prior embodiments, the embodiment of FIG. 11 contemplates movement of the retaining bar 262 along its entire length in a direction that is substantially parallel with the direction of applied force (arrows 264 and 266). In order to maintain the retaining bar 262 in engagement with the stop 270 in a resting state, a pair of compression springs 288 and 290 are provided between raised abutments 291 and 293 at each respective end of the retaining bar 262, and the respective side walls 292 and 294 of the housing 258. The spring constant of each spring 288 and 290 is approximately equal, and the free length of each spring is also approximately equal so that the retaining bar shoulder 268 is substantially centered in the housing. This embodiment, like the other embodiments described herein, requires application of force to only one of the two opposing sides of the retaining bar 262 in order to slidably release the anchor 272 from the housing 258.

Figure 12:
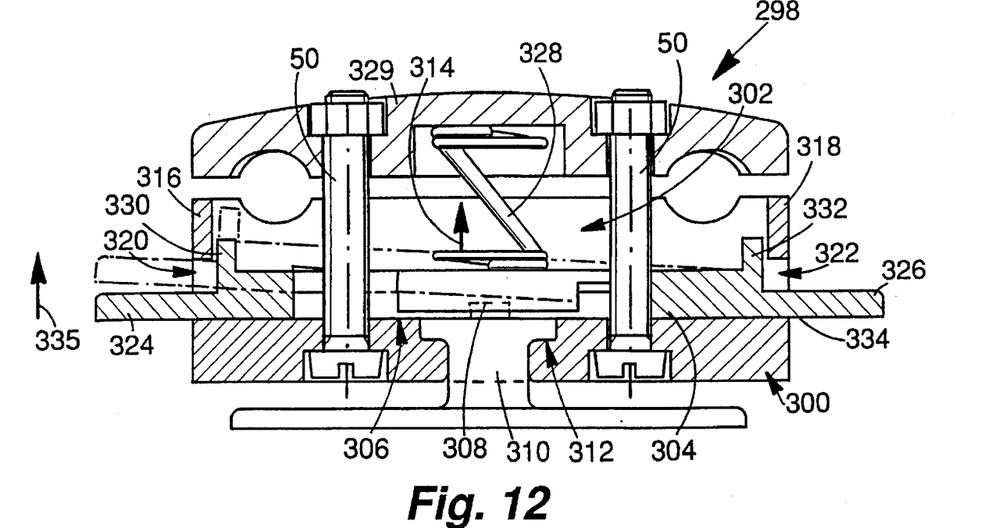
FIG. 12 is a front cross-section of another alternative embodiment of a clamping device according to this invention.

Finally, FIG. 12 illustrates another embodiment of a clamping device 298 according to this invention. Again, a clamping housing 300 suitable for mounting to the support bars (not shown) of a bicycle saddle is illustrated, but a variety of other mounting structures can be provided according to this invention. The housing 300 in this embodiment includes a hollow interior 302 that accommodates the retaining bar 304. The retaining bar 304, in a resting state abuts the lower surface 306 of the housing 300 and, in this state, engages a stop 308 in the anchor 310. Again, the stop 308 in this example comprises a projecting structure. According to this embodiment, the retaining bar 304 comprises a substantially rigid member adapted to translate in a direction away from the anchor 310 and slot 312 as shown by the arrow 314. The side walls 316 and 318 of the housing include enlarged openings 320 and 322, respectively, that allow substantial translation of the retaining bar ends 324 and 326 along the direction of the arrow 314. A large diameter compression coil spring 328, located between the clamping plate 329 and the retaining bar 304, biases the retaining bar 304 against the lower surface 306. A plurality of coil springs, leaf springs or other appropriate compression springs can be utilized according to this invention.

The retaining bar 304 is retained laterally in the housing by means of abutments 330 and 332 that engage the respective adjacent side walls 316 and 318 of the housing 300. These abutments 330 and 332 are substantially longer than those of prior described embodiments since the openings 320 and 322 on each side of the housing 300 are larger to accommodate movement of the retaining bar ends 324 and 326, respectively.

When one end (324 in this example) of the retaining bar 304 is raised by application of force along a direction of the arrow 335 (as shown in phantom), the retaining bar 304 rotates along the opposing corner 334 of the housing lower surface 306 and moves sufficiently upwardly to disengage to stop 308. The bar 304 rotates in a direction that is substantially "parallel" to the direction of applied force. As defined herein, parallel includes substantially concentric. Note that the applied force vector will actually curve slightly as the bar end 324 moves upwardly. This curve is concentric with the center of rotation at the corner 334. Either end 324 or 326 of the bar 304 can be rotated about the opposing surface corner. Similarly, both ends 324 and 326 of the bar 304 can be simultaneously raised in which case the entire bar moves linearly parallel to applied force.

Figure 13:
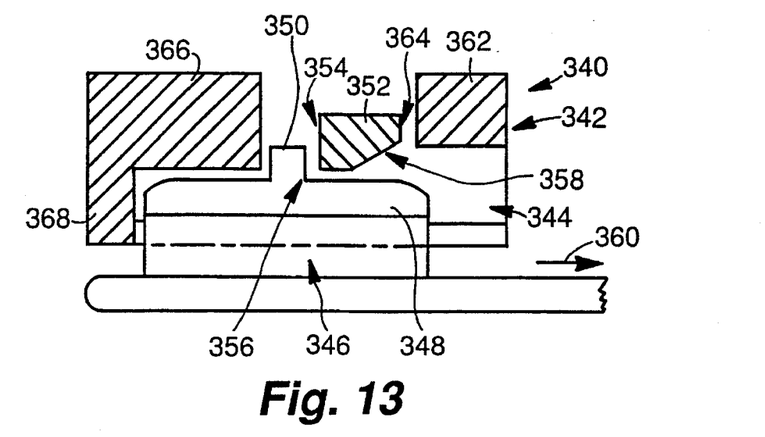
FIG. 13 is a side cross-section of another alternative embodiment of a clamping device according to this invention.

Yet another alternative embodiment of a clamping device 340 is depicted in FIG. 13. This clamping device includes a housing 342 having a slot 344 into which an anchor 346 is slidably received. As noted above, the stop according to this embodiment can include a projecting structure. Hence, the enlarged head 348 of the anchor 346 includes a projection 350 that comprises a stop according to this invention. The projection is retained against slidable movement out of the slot by a retaining bar 352 having a wall 354 that engages an opposing wall 356 of the projection. The retaining bar can comprise a suitably flexible material according to this invention or can be moved out of engagement with the stop by any suitable retaining bar structure as set forth herein. The retaining bar 352 includes a ramped surface 358 that enables the projection to be slid into the slot, with the ramped surface of the retaining bar passing over the projection 350 and moving the retaining bar out of interfering engagement with the projection 350. Hence, the anchor 346 can be automatically locked in the slot 344. However, removal of the anchor 346 from the Slot 344 requires positive actuation of the retaining bar 352 to move it out of engagement with the stop 350. Note that movement of the anchor out of the slot as shown by the direction arrow 360 would cause the projection 350 to bear against the retaining bar 352. The forward housing wall 362 acts as a brace that further supports the retaining bar 352 via engagement of the rear retaining bar 364 with the housing wall 362. Hence, the retaining bar 352 is fully supported by the housing and the anchor is securely held in the slot against slidable movement.

As another embodiment described herein, the rearward wall of the housing 366 includes an end wall 368 positioned in front of the slot 344 that limit movement of the anchor 346 out of the slot. This end wall 368 can be omitted in certain embodiments as will be described further in FIG. 14.

Figure 14:
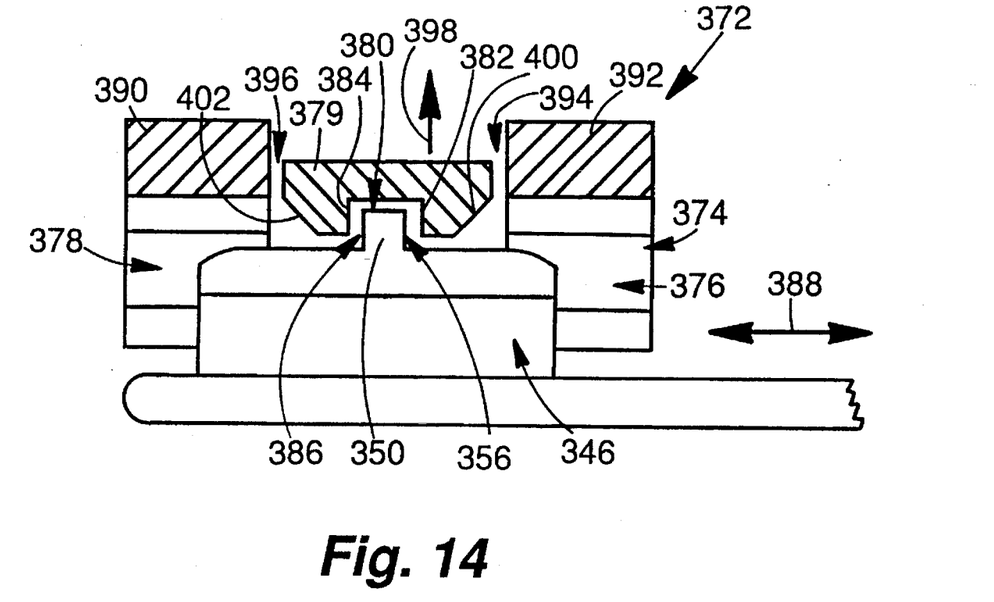
FIG. 14 is a side cross-section of yet another alternative embodiment of a clamping device according to this invention.

With further reference to FIG. 14, the anchor 346 having a projection 350 is again illustrated. The housing 372, according to this embodiment, defines a slot 374 into which the anchor is slidably moved. This slot includes two opposing openings 376 and 378 located at each of opposing ends of the housing 372. The retaining bar 379, according to this embodiment, comprises, essentially, a groove 380 having vertical end walls 382 and 384. In a resting state, end wall 382 opposes projection wall 356 while end wall 384 opposes projection wall 386. Accordingly, the retaining bar maintains the anchor against slidable movement in the slot in each of two opposing directions as shown by the double arrow 388.

The retaining bar is backed up by opposing housing walls 390 and 392 that bear against the retaining bar walls 394 and 396. Accordingly, the retaining bar is firmly supported against dislocation along the direction of slidable movement (arrow 388). Again, the retaining bar according to this embodiment can be actuated to disengage from the projection using a variety of structures as set forth hereinabove. Essentially, this retaining bar, as well as the retaining bar of FIG. 13, would require vertical displacement along the arrow 398 to disengage from the projection 350. However, by providing recesses upon opposing sides of the groove 380, a laterally sliding retaining bar such as that shown in FIG. 11 can also be utilized.

As in the embodiment of FIG. 13, a ramp surface 400 is provided to one side of the retaining bar. Additionally, a second opposing ramp surface 402 is also provided to opposing side of the retaining bar. Either of these ramp surfaces allow the projection to raise the retaining bar out of engagement so that the anchor can be automatically interlocked with the retaining bar upon slidable movement into the slot. In this instance, slidable movement can be initiated through either opening 376 or 378.

The foregoing has been a detailed description of preferred embodiments. Various modifications and equivalents can be made without departing from the spirit and scope of this invention. For example, an anchor is shown that allows two opposing orientations relative to the housing. The anchor can be constructed to allow more than two orientations by shaping the sides of the anchor so that they can pass in slidable engagement through the slot of the housing. Similarly, the shape of the shoulder, groove and actual retaining bar can be altered as necessary to fit into different sized housings. This description is, therefore, meant to be taken only by way of example and not to otherwise limit the scope of the invention.

What is claimed is:

1. A clamping device comprising:

an anchor having a stop;

a housing including sides that define a slot that slidably receives the anchor along a direction of slidable movement; and a retaining bar located in the housing that includes at least a first end that projects from the housing, the first end projecting outwardly from the one of the sides of the housing and thereby defining a direction of projection that is aligned substantially transversely to the direction of slidable movement, the retaining bar engaging the stop in a resting state to retain the anchor in the slot against slidable movement, the retaining bar and the housing being constructed and arranged so that application of force to the first end in a first direction causes the retaining bar to move in a second direction away from the stop so that the retaining bar disengages the stop.

2. A clamping device as set forth in claim 1 wherein the retaining bar further comprises a second end that projects from the housing and wherein application of force to the second end in a third direction substantially opposite the first direction causes the bar to move in the non-parallel second direction so that the retaining bar disengages the stop.

3. A clamping device as set forth in claim 2 wherein each of the retaining bar and the housing include interengaging abutments that limit movement of the first end in the third direction and movement of the second end in the first direction.

4. A clamping device as set forth in claim 3 wherein the retaining bar comprises a leaf spring that buckles along the second direction upon application of force to at least one of the first end in the first direction and the second end in the third direction.

5. A clamping device as set forth in claim 4 wherein at least one of the first end and the second end includes a handle that extends transversely to a direction of extension of the retaining bar between the first and the second end, wherein application of force to the handle produces a bending moment along the bar.

6. A clamping device as set forth in claim 3 wherein the retaining bar comprises a pair of bar sections joined by a hinge, wherein application of force to at least one of the first end in the first direction and the second end in the third direction causes the sections to fold at the hinge so that the hinge translates in the second direction.

7. A clamping device as set forth in claim 6 wherein at least one of the first end and the second end includes a handle that extends transversely to a direction of extension of the bar, wherein application of force to the handle produces a rotational moment along the bar.

8. A clamping device as set forth in claim 6 further comprising a spring located in the housing and applying a biasing force to the bar sections in a direction substantially opposite the second direction so that the retaining bar is biased against the anchor.

9. A clamping device as set forth in claim 1 wherein the anchor is constructed and arranged to slide into the slot in each of two opposing orientations and wherein the anchor, the retaining bar and the housing are constructed and arranged so that the anchor is retained in the slot in each of the two opposing orientations.

10. A clamping device as set forth in claim 9 wherein the anchor includes two grooves wherein each groove is engaged by the retaining bar in each of the opposing orientations respectively.

11. A clamping device as set forth in claim 10 wherein the retaining bar further comprises a shoulder that projects toward the slot constructed and arranged to engage each groove.

12. A clamping device as set forth in claim 1 wherein the stop comprises a groove and wherein the retaining bar includes a shoulder constructed and arranged to engage the groove when the retaining bar is in the resting state.

13. A clamping device as set forth in claim 1 wherein the anchor includes a projecting stop and the retaining bar includes a groove constructed and arranged to engage the projecting stop when the retaining bar is in the resting state.

14. A clamping device as set forth in claim 1 wherein the stop comprises a projection having a wall that bears against an opposing wall of the retaining bar in a resting state, the walls being substantially perpendicular to a direction of slidable movement of the anchor and the slot.

15. A clamping device as set forth in claim 1 wherein the anchor is interconnected with a bicycle accessory and wherein the housing is interconnected with a bicycle frame.

16. A clamping device as set forth in claim 15 wherein the bicycle accessory comprises a bag.

17. A clamping device as set forth in claim 15 wherein the housing includes at least a pair of clamping halves and a screw for moving the clamping halves toward and away from each other so that the clamping halves removably engage the bicycle frame.

18. A clamping device as set forth in claim 1 wherein the retaining bar comprises a leaf spring having a thickness taken along a line substantially parallel to the second direction and a width taken along a direction substantially transverse to and coplanar with the first direction, wherein the thickness is less than the width.

19. A clamping device as set forth in claim 18 wherein the leaf spring further comprises a shoulder extending into the slot in the resting state, the shoulder engaging the stop.

20. A clamping device as set forth in claim 19 wherein the stop comprises a recessed groove and wherein the shoulder includes a flat edge and an opposing rounded edge, the rounded edge facing an open end of the slot so that the anchor passes over the rounded edge when sliding into the slot, the anchor thereby causing the retaining bar to translate away from the slot as the anchor passes thereover, and the flat edge subsequently retaining the anchor in the slot when the shoulder engages the groove.

21. A clamping device as set forth in claim 1 wherein the retaining bar extends transversely through the housing and each of the housing and retaining bar include interengaging abutments that retain the retaining bar relative to the housing.

22. A clamping device comprising:

an anchor having a stop;

a housing including a slot that slidably receives the anchor;

a retaining bar located in the housing that includes at a first end that projects from a first side of the housing, and a second end that projects from an opposing second side of the housing, the retaining bar engaging the stop in a resting state to retain the anchor in the slot, the bar and the housing being constructed and arranged so that application of force to one of the first end and the second end causes the bar to disengage from the stop.

23. A clamping device as set forth in claim 22 wherein application of force to one of the first end, the second end and a combination of the first end and the second end causes the bar to disengage from the stop.

24. A clamping device as set forth in claim 23 wherein the retaining bar comprises a shaft rotatably mounted in the housing and passing through and projecting from each of the first and the second side of the housing, the stop comprising a recessed groove on the anchor and the shaft including thereon a lever having a shoulder that engages the groove, the shaft further including thereon a first and a second handle at each of the first and the second end of the bar, the first and the second handle extending substantially transversely to a direction of extension of the shaft between the first end and the second wherein application of force to one of the first end, the second end and a combination of the first end and the second end causes the shaft to rotate so that the shoulder disengages the groove.

25. A clamping device as set forth in claim 24 further comprising a spring located in the housing that biases the shoulder toward the groove.

26. A clamping device as set forth in claim 23 wherein the housing includes a cavity and the retaining bar comprises an elongated member having a locking structure positioned therealong that engages the stop, the member being positioned in the cavity, the cavity having a first surface proximate the anchor and a second, opposing, surface more remote from the anchor, the member movable in the cavity between the first surface and the second surface wherein application of force to one of the first end, the second end and a combination of the first end and the second end in a predetermined direction substantially perpendicular to the first surface of the cavity causes the locking structure to disengage the stop.

27. A clamping device as set forth in claim 26 further comprising a spring located in the housing and biasing the member toward the first surface wherein the locking structure engages the stop.

28. A clamping device as set forth in claim 22 wherein the elongated member includes a pair of abutments located adjacent each of the first and second ends, the abutments engaging each of the first side and the second side of the housing to retain the elongated member within the housing free of substantial movement in a direction transverse to the predetermined direction.

29. A clamping device as set forth in claim 22 wherein the retaining bar includes a locking structure that engages the stop, the bar further including a pair of recesses positioned therealong adjacent opposing sides of the locking structure, the bar constructed and arranged to translate laterally toward each of the first side and the second side of the housing so that the locking structure is moved out of engagement with the stop, the stop being adjacent the recess upon lateral translation of the retaining bar.

30. A clamping device as set forth in claim 29 wherein the retaining bar includes, proximate each of the first end and the second end thereof, a respective abutment that engages each of the first side and the second side of the housing, respectively, as the bar is translated through a predetermined range of lateral movement, each of the abutments maintaining the bar laterally within the housing.

31. A clamping device as set forth in claim 30 further comprising a first compression spring positioned between the first side of the housing and a respective retaining bar abutment and a second compression spring positioned between the second side of the housing and a respective retaining bar abutment.

32. A clamping device as set forth in claim 22 wherein the anchor is interconnected with a bicycle accessory and wherein the housing is interconnected with a bicycle frame.

33. A clamping device as set forth in claim 32 wherein the accessory comprises a bag.

34. A clamping device as set forth in claim 22 wherein the anchor is interconnected with a bicycle accessory and wherein the housing is interconnected with a bicycle frame.

35. A clamping device as set forth in claim 34 wherein the bicycle accessory comprises a bag.

36. A clamping device comprising:

an anchor;

a housing including a slot that slidably receives the anchor; and a retaining bar that is moveable between a position that retains the anchor in the slot substantially free of slidable motion of the anchor relative to the slot, to a position that allows the anchor to slide free of the slot, the anchor being slidable into the slot in at least two orientations relative to the slot and each of the anchor and the retaining bar being constructed and arranged so that the anchor is engaged by and retained by the retaining bar, free of slidable movement relative to the slot, in each of the at least two orientations.

37. A clamping device as set forth in claim 36 wherein the anchor includes a pair of stops thereon, each of the stops being engaged by the retaining bar in each of two orientations.

38. In a clamping device wherein an anchor is removably attached to a slot in a housing along a direction of slidable movement the leaf spring being elongated in a direction substantially transverse to the direction of slidable movement, a retaining bar that secures the anchor into the slot comprising:

an elongated leaf spring that lockably engages the anchor; and at least a first leaf spring end projecting from the housing, wherein application of force to the first leaf spring end in a first direction causes the leaf spring to flex in a second direction to disengage the anchor.

39. A retaining bar as set forth in claim 38 further comprising a second leaf spring end projecting from an opposite side of the housing wherein application of force to the second end in a third direction, substantially opposite the first direction, causes the leaf spring to flex in the second direction to disengage the anchor.

40. A retaining bar as set forth in claim 38 further comprising a shoulder located on the retaining bar and a groove located on the anchor, the shoulder engaging the groove to retain the anchor in the slot.

41. A retaining bar as set forth in claim 40 wherein the anchor includes, along a side that carries the groove, a rounded surface and wherein the shoulder projects away from the rounded surface.

42. A retaining bar as set forth in claim 41 wherein the shoulder includes a flat side and a rounded side, the rounded side facing an open end of the housing through which the anchor passes into the slot, so that passage of the anchor over the shoulder causes the leaf spring to flex.

43. A retaining bar as set forth in claim 38 wherein the first leaf spring end includes a handle, and wherein the first leaf spring is aligned with a longitudinal axis extending through the housing in a direction of extension, and wherein the leaf spring further includes a handle extending substantially transversely to the direction of extension of the leaf spring, wherein application of force to a point along the handle in the first direction induces a bending moment in the leaf spring.

44. A retaining bar as set forth in claim 38 further comprising a projecting stop located on the anchor and an opposing interengaging wall located on the retaining bar, the wall engaging the stop to retain the anchor in the slot.

45. A method for removably interlocking an anchor having a stop with a housing having a slot comprising the steps of:

slidably locating the anchor within the slot so that a flexible elongated leaf spring positioned in the housing engages the stop;

applying a force in a first direction to at least a first end of the leaf spring and substantially resisting movement in the first direction at a second end, the step of applying including directing force aligned along an axis approximately between the first end and the second end so that the leaf spring buckles between the first end and the second end in a second direction away from the stop to disengage the leaf spring from the stop; and slidably removing the anchor from the slot.

46. The method as set forth in claim 45 further comprising applying force in a third direction, substantially opposite the first direction, to an opposing second end of the leaf spring so that the leaf spring buckles in the second non-parallel direction.

47. A clamping device comprising:

an anchor having a stop comprising one of a projecting wall and a recessed groove;

a housing including sides that define a slot that slidably receives the anchor along a direction of slidable movement; and a retaining bar located in the retaining bar located in the housing and including at least a first end that projects from the housing outwardly from one of the sides in a direction transverse to the direction of slidable movement, the retaining bar engaging the stop in a resting state to retain the anchor in the slot, the retaining bar and the housing being constructed and arranged so that application of force to the first end in a first direction causes the bar to move relative to the anchor so that the retaining bar disengages the stop.

48. A clamping device as set forth in 47 wherein the retaining bar further comprises a second end that projects from the housing and wherein application of force to the second end in a third direction substantially opposite the first direction causes the bar to move in the second direction so that the retaining bar disengages the stop.

49. A clamping device as set forth in claim 48 wherein each of the retaining bar and the housing include interengaging abutments that limit movement of the first end in the third direction and movement of the second end in the first direction.

50. A clamping device as set forth in claim 49 wherein the wall of the retaining bar defines a wall of a recessed groove on the retaining bar and wherein the stop comprises the projecting wall.

\* \* \* \* \*